July 21, 1953  H. E. BONANDER ET AL  2,646,076
IRRIGATION VALVE

Filed March 10, 1952  2 Sheets-Sheet 1

INVENTORS
HAROLD EMORY BONANDER
PETE A. BACKMAN
BY
Webster & Webster
ATTORNEYS

July 21, 1953  H. E. BONANDER ET AL  2,646,076
IRRIGATION VALVE
Filed March 10, 1952  2 Sheets-Sheet 2

INVENTORS
HAROLD EMORY BONANDER
PETE A. BACKMAN
BY
Webster & Webster
ATTORNEYS

Patented July 21, 1953

2,646,076

UNITED STATES PATENT OFFICE 2,646,076

IRRIGATION VALVE

Harold Emory Bonander and Pete A. Backman, Turlock, Calif.

Application March 10, 1952, Serial No. 275,814

4 Claims. (Cl. 137—737)

The present invention directed to an improved irrigation valve; the valve being of the screw-actuated type adapted to be mounted on a standpipe of an underground irrigation system.

A major object of this invention is to provide an improved irrigation valve which embodies a novel valve assembly; such valve assembly including a valve seat formed by an upstanding annular metallic band, and a screw actuated circular valve disk having a depending annular flange tapering downwardly and inwardly, whereby to engage in valve closing relation in the seat.

Another important object of this invention is to provide novel means to secure the irrigation valve on the upper end of an existing cement standpipe of an underground irrigation system.

An additional object of this invention is to provide an irrigation valve which is designed for ease and economy of manufacture; the design being such that no castings are required, and the entire valve assembly can be manufactured in the main from sheet metal.

A still further object of the invention is to provide an irrigation valve which is light in weight, but rugged and durable in structure.

Still another object of the invention is to provide a practical and reliable irrigation valve, and one which will be exceedingly effective for the purpose for which it is designed.

These objects are accomplished by means of such structure and relative arrangement of parts as will fully appear by a perusal of the following specification and claims.

Figure 1:
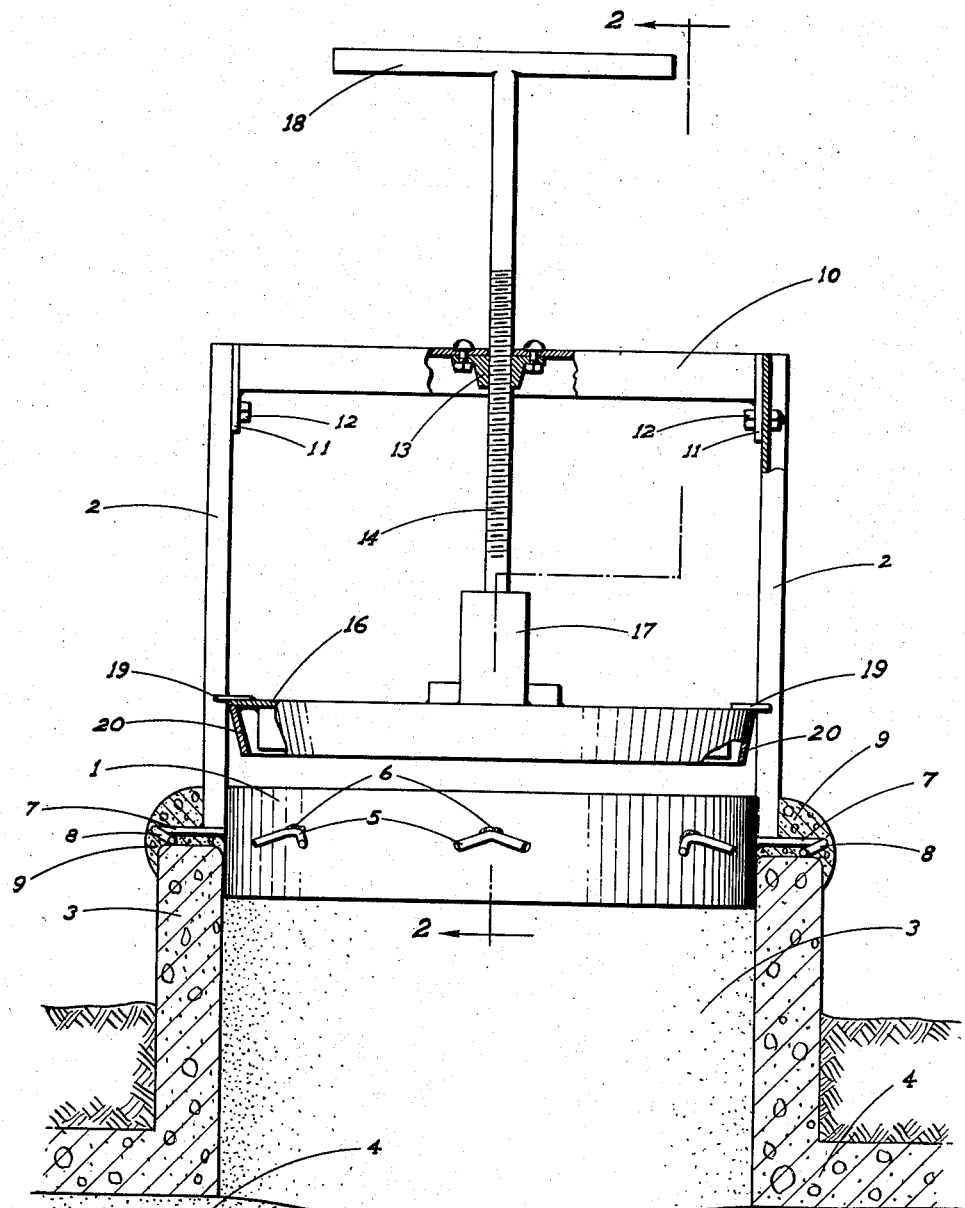
Fig. 1 is a side elevation of the irrigation valve as mounted for use; the standpipe and portions of the valve being in section.
Figure 2:
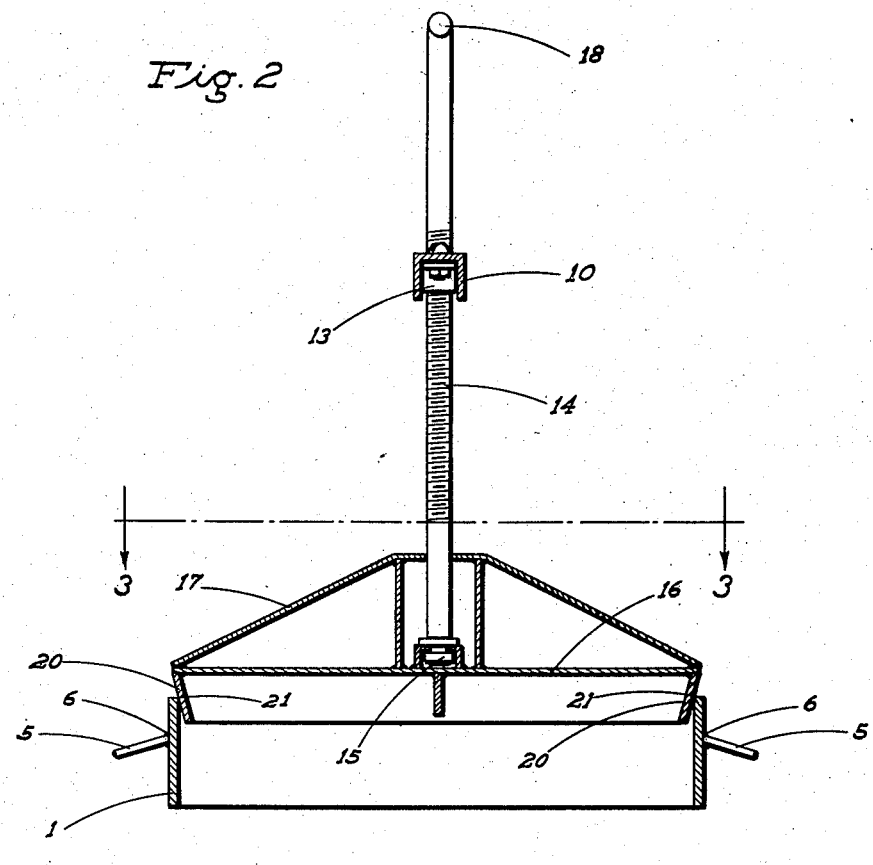
Fig. 2 is a fragmentary transverse sectional elevation of the valve assembly; the view being taken on line 2—2 of Fig. 1.
Figure 3:
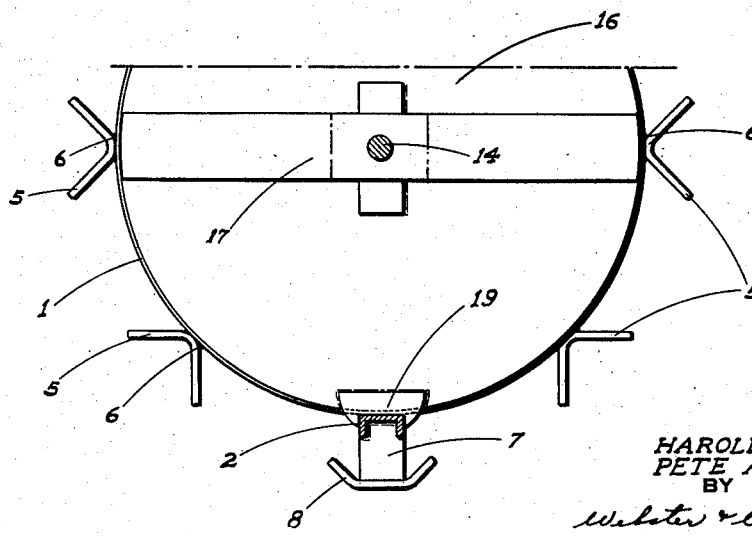
Fig. 3 is a fragmentary plan view of the valve assembly taken on line 3—3 of Fig. 2.

Referring now more particularly to the characters of reference on the drawings the irrigation valve comprises an annular metallic band indicated generally at 1, which band is of substantial width, being disposed with its axis vertical.

On opposite sides thereof, the annular metallic band 1 is fitted with upwardly projecting side posts 2; such posts terminating at their lower ends intermediate the upper and lower edges of said band. This leaves the lower portion of the band 1 free for insertion in matching relation in the upper end of a concrete standpipe 3 which extends to above ground from an underground irrigation pipe 4.

At circumferentially spaced points the band 1 is fitted exteriorly with a plurality of V-shaped anchor elements 5. The V-shaped anchor elements 5 are welded at their axes, as at 6, to the outside of the band 1 substantially centrally between the upper and lower edges of the latter. From the welded point 6 the legs of the V-shaped anchor elements 5 extend outwardly and slightly downwardly in divergence.

At the lower ends of the side post 2 the same are fitted with horizontal, laterally outwardly projecting feet 7, and in turn such feet carry, at their outer ends, inwardly and downwardly diagonaled anchor elements 8.

When the band 1 is partially inserted in the standpipe 3, as shown in Fig. 1, the tips of the anchor elements 5 rest on the upper end of the standpipe in supporting and stabilizing relation to the valve.

The anchor elements 5 and 8 are fixed to the standpipe 3 by embedding such elements in a ring of concrete 9.

A horizontal top cross-bar 10 extends between the upper ends of the side posts 2, and said cross-bar 10 is secured to such posts 2 by vertical attachment flanges 11 on the cross-bar secured by bolts 12.

Centrally of its ends the top cross-bar 10 is fitted with a vertical axis nut 13 and a vertical screw 14 is threaded through such nut. Some distance below the nut 13, the lower end of the screw 14 is rotatably connected as at 15, centrally to the top of a horizontal metallic valve plate or disc 16; such disc—to strengthen the same—being fitted on top with transversely and diametrically extending truss-like strap bracing 17. This bracing includes vertical members 17a on opposite sides of the screw connection 15, the screw projecting through a hole in the top strap of the brace.

The vertical screw 14 is formed at its upper end above the top cross-bar 10 with a transverse handle 18.

On opposite sides and immediately adjacent the posts 2, the disc 16 is fitted with notched guides 19 which straddle said posts in relatively slidable relation whereby to maintain the disc 16 against rotation as it is run up or down by the screw 14.

The disc 16 is fitted at its periphery with a depending annular flange 20 which tapers downwardly and inwardly; such flange, at its upper edge, being of a diameter substantially the same as band 1, but at its lower edge being of a diameter substantially lesser than said band. With this structure the depending annular flange 20 works into the band 1 in the manner of a plug valve. The upper inner corner 21 of the band 1 forms the annular seat against which the flange 20 engages in valve closing relation when the disc 16 is run downward to its bottom limit.

The above structural arrangement not only provides a valve which can be regulated with nicety, but also a valve which is leak-proof when closed.

Additionally, the structure of the valve assembly is such that it can be fabricated readily and economically from sheet metal plate and bars without the need of costly castings; this being especially true with respect to the tapered flange 20, as its manufacture from sheet metal or scrap iron is advantageous.

Another advantage of the described irrigation valve is its convenience of mounting on a standpipe, which mounting can be carried out without the use of tools other than those required to apply the ring 9 of concrete.

From the foregoing description it will be readily seen that there has been produced such a device as substantially fulfills the objects of the invention, as set forth herein.

While this invention sets forth in detail the present and preferred construction of the device, still in practice such deviations therefrom may be restorted to as do not form a departure from the spirit of the invention as defined by the appended claims.

Having thus described the invention, the following is claimed as new and useful, and upon which Letters Patent are desired.

1. An irrigation valve comprising an annular metallic band of substantial width and disposed with its axis vertical, a circular valve disposed above and mounted in connection with the band for cooperation therewith, and a plurality of circumferentially spaced anchor elements projecting from the band a distance above its lower edge whereby the lower portion of the band is adapted to depend into a standpipe with said elements resting on the upper end of the latter; said anchor elements comprising outwardly and downwardly inclined, rod-like elements whereby their outer tips only engage the upper end of the standpipe.

2. An irrigation valve, as in claim 1, including a ring of concrete formed on the upper end of the standpipe, and in which ring said elements are embedded.

3. An irrigation valve, as in claim 1, in which said anchor elements are V-shaped and attached at the apex to said band.

4. An irrigation valve including, with a circular band forming a valve seat, a valve to engage the seat comprising a top disc, a depending downwardly tapered flange secured on and about the disc for engagement in the band, a central screw engaging and retaining means on the disc, and a diametral upwardly projecting truss-like strap brace secured on the disc and including vertical members on opposite sides of said screw retaining means and secured to the disc, the brace being orificed between the members to receive the screw therethrough.

HAROLD EMORY BONANDER.
PETE A. BACKMAN.

References Cited in the file of this patent

UNITED STATES PATENTS

| Number | Name | Date |
|---|---|---|
| 1,140,510 | Gardener | May 25, 1915 |
| 1,875,857 | Cruff et al. | Sept. 6, 1932 |
| 2,248,381 | Pedersen | July 8, 1941 |